United States Patent
Su et al.

(10) Patent No.: US 9,163,531 B2
(45) Date of Patent: Oct. 20, 2015

(54) SELF-ADAPTIVE HYDRAULIC VARIABLE VALVE TIMING SYSTEM FOR DIESEL ENGINE AND CONTROL METHOD

(76) Inventors: Wanhua Su, Tianjin (CN); Qiang Zhan, Tianjin (CN); Yiqiang Pei, Tianjin (CN); Erxi Liu, Tianjin (CN); Songlin Wu, Tianjin (CN)

( * ) Notice: Subject to any disclaimer, the term of this patent is extended or adjusted under 35 U.S.C. 154(b) by 111 days.

(21) Appl. No.: 13/254,170
(22) PCT Filed: Oct. 29, 2010
(86) PCT No.: PCT/CN2010/078230
§ 371 (c)(1),
(2), (4) Date: Sep. 1, 2011
(87) PCT Pub. No.: WO2012/012973
PCT Pub. Date: Feb. 2, 2012

(65) Prior Publication Data
US 2013/0125844 A1 May 23, 2013

(30) Foreign Application Priority Data
Jul. 30, 2010 (CN) .......................... 2010 1 0241776

(51) Int. Cl.
F01L 1/34 (2006.01)
F01L 1/14 (2006.01)
F02D 13/02 (2006.01)
F01L 13/00 (2006.01)
F01L 1/18 (2006.01)
F01L 9/02 (2006.01)
(Continued)

(52) U.S. Cl.
CPC . F01L 1/34 (2013.01); F01L 1/146 (2013.01); F01L 13/0031 (2013.01); F02D 13/0226 (2013.01); F01L 1/181 (2013.01); F01L 9/025 (2013.01); F01L 2001/34423 (2013.01); F01L 2013/0089 (2013.01); F02B 3/06 (2013.01); Y02T 10/18 (2013.01)

(58) Field of Classification Search
CPC ......... F01L 1/146; F01L 13/0031; F01L 1/34; F02D 13/0226
USPC ......... 91/490; 123/90.12, 90.61, 90.63, 198 F
See application file for complete search history.

(56) References Cited

U.S. PATENT DOCUMENTS 2,672,132 A * 3/1954 Randol ...................... 123/90.53
4,050,435 A * 9/1977 Fuller, Jr. ............ F01L 13/0005
123/182.1

(Continued)

FOREIGN PATENT DOCUMENTS

EP 270181 A2 * 6/1988 ................ F03C 1/04

*Primary Examiner* — Jorge Pereiro
*Assistant Examiner* — Jason T Newton
(74) *Attorney, Agent, or Firm* — George G. Wang; Bei & Ocean

(57) ABSTRACT

Self-adaptive hydraulic variable valve timing system for an internal combustion diesel engine, comprising an electronic control unit, an oil pump, a pressure regulating reversing valve, an oil return tube, an oil line, an oil supply main tube, an oil supply branch tube, and a self-adaptive pushrod length changing assembly. When the engine's oil exceeds 70° C., and engine's rotational speed is greater than or equal to 1300 r/m, and engine's load is greater than or equal to 50%, the control unit is configured to send instructions to the pressure regulating reversing valve to switch oil flow direction towards the oil line which leads to the self-adaptive pushrod length changing assembly and thereby put the engine in an operating mode.

7 Claims, 6 Drawing Sheets

(51) Int. Cl.
*F01L 1/344* (2006.01)
*F02B 3/06* (2006.01)

(56) References Cited

U.S. PATENT DOCUMENTS

| | | | | |
|---|---|---|---|---|
| 4,407,241 | A * | 10/1983 | Butler et al. | 123/90.16 |
| 5,085,181 | A * | 2/1992 | Feuling | 123/90.12 |
| 6,199,523 | B1 * | 3/2001 | Neubauer et al. | 123/90.15 |
| 7,004,122 | B2 * | 2/2006 | Cornell | F01L 1/146 |
| | | | | 123/90.12 |
| 7,201,121 | B2 * | 4/2007 | Weber | F02B 37/004 |
| | | | | 123/559.1 |
| 7,225,776 | B2 * | 6/2007 | Gecim et al. | 123/90.39 |
| 7,237,520 | B2 * | 7/2007 | Haefner | 123/90.48 |
| 7,246,590 | B2 * | 7/2007 | Karbstein et al. | 123/90.61 |
| 7,617,807 | B2 * | 11/2009 | Diggs et al. | 123/90.48 |
| 7,950,359 | B2 * | 5/2011 | Choi | 123/90.15 |
| 8,235,022 | B2 * | 8/2012 | Ni et al. | 123/196 CP |
| 2004/0187835 | A1 * | 9/2004 | Hoff et al. | 123/196 R |
| 2007/0240659 | A1 * | 10/2007 | Rozario et al. | 123/90.59 |
| 2009/0056653 | A1 * | 3/2009 | Schmidt et al. | 123/90.16 |
| 2010/0186701 | A1 * | 7/2010 | Hicks et al. | 123/90.55 |
| 2012/0067313 | A1 * | 3/2012 | Choi | F01L 13/0031 |
| | | | | 123/90.16 |
| 2014/0109849 | A1 * | 4/2014 | Kim | F02D 13/02 |
| | | | | 123/90.15 |

\* cited by examiner

SELF-ADAPTIVE HYDRAULIC VARIABLE VALVE TIMING SYSTEM FOR DIESEL ENGINE AND CONTROL METHOD

FILED OF THE INVENTION

The present invention relates to a self-adaptive hydraulic variable valve timing system for an internal combustion engine and a control method.

BACKGROUND OF THE INVENTION

Traditional four-stroke piston engines generally adopt a valve actuating mechanism of actuating the intake valve and the exhaust valve by a mechanical camshaft. The valve movement controls timing by mechanical drive between a crankshaft and a camshaft, and the camshaft and each valve. Such a mechanism has proved to be simple, effective and reliable for quite a long time, and the cost thereof is relatively low. However, parameters, such as the opening duration and phase, of such a valve mechanism are constant and cannot be regulated during operation of the engine, timing cannot be changed in different operational states, and thus the potential of the engine performance cannot be brought into full play. The timing of valve opening and closing as well as the lift need regulation in the combustion process of the advanced modern internal combustion engines, and the VVT (variable valve timing) system based on mechanical and electrohydraulic control widely used for gasoline engines is the most typical prototype. However, for diesel engines, in particular, heavy-duty diesel engines, valve regulation mechanisms applicable in practice are rarely reported due to the complexity in structure and the intensity of force exerted on the regulation devices. Since the 1980s, energy and environmental issues have become increasingly prominent, and the society's demands on issues of fuel economy and noxious emissions are becoming increasingly intense, and more attention has been drawn to the issues as how to improve engine performance and thermal efficiency, and how to reduce noxious emissions. Development of a variable valve timing mechanism has become the key technology in the development of modern diesel engines.

The timing phase and duration has a direct impact on the engine's intake and exhaust performance, and they are of crucial importance for the quality of the combustion process. Issues such as fuel economy, low speed stationarity and exhaust emission under high speed power, low speed torque, idling speed fuel consumption and partial loading of the engine should be taken into consideration to select timing phase and duration. In order to achieve a sound engine performance, the timing phase should vary with rotational speed and load. The engine requires a relatively big valve overlapping angle and a later intake valve closing angle at high speed and under a heavy load so as to achieve a relatively high power output. Conversely, it requires an earlier intake valve closing angle and a relatively small valve overlapping angle at idling speed and low speed under a light load so as to achieve a good idling speed stationarity and exhaust emission performance.

Thanks to engineers' effort to reduce noxious emissions of the engine and improve the engine's operation efficiency, exhaust gas recirculation (EGR) and post-processing techniques have been developed. However, the decrease in the engine's noxious emissions has resulted in a drop of engine efficiency, while the adoption of a high boost pressure may result in an engine maximum explosion pressure that is too high. Variable valve timing can realize Miller cycle by changing the timing of valve opening and closing, and under certain operation conditions of the engine, some of the air that has already entered the cylinder may reenter the intake manifold by delaying the closing time of the intake valve and a certain air pressure is maintained under the effect of turbocharging, by which the engine's air intake efficiency can be greatly enhanced and the suction loss of the pump will be reduced. This leads to a decrease in actual compression ratio and an expansion ratio greater than the compression ratio, which improves efficiency and reduces the maximum explosion pressure of engine operation.

Compared to fixed valve timing, variable valve timing is able to provide variable valve opening and closing timing or lift at different rotational speed and load within different engine operation ranges so as to improve the engine's air intake and exhaust performance, and better meet the demands of engine's dynamic properties, economy and exhaust emissions at high and low speed and under great and small load, which can improve the engine's overall performance. In order to further improve the engine's dynamic properties and reduce noxious emissions, the combustion process thereof should usually be rearranged, and in the process of the rearranged combustion process, the quantities of air intake and exhaust and the phase of valve opening and closing should be regulated timely to achieve optimal combustion process and realize higher efficiency and cleaner combustion. The development of high technology nowadays has taken energy conservation, efficiency enhancement and low emissions of automobile engine as an integrated task of "energy conservation-high efficiency-environmental protection" for comprehensive research and technical development. The limitations of fixed valve timing cannot meet the ever-changing requirements of the present time, thereby making variable valve timing one of the focuses for the automobile engine research.

Due to the advantages of variable valve timing, it has drawn more and more attention. Overseas research institutes have conducted a great deal of research on it, and various variable valve actuating mechanisms have been invented. While some of the systems have realized the function of variable valve parameters, only a few mechanisms can be practiced with simple structures and low cost. The majority of variable valve actuating mechanisms are still at experimental stage due to cost and reliability issues. The main operation mode of the variable valve actuating mechanisms in the existing products is changing the phase of the camshaft, where significant changes have to be made to the original engines, and it is often seen in low power gasoline engines. There are two types of air intake and exhaust camshafts for high power diesel engines, i.e. "overhead camshaft" and "side/bottom-mounted camshaft". Since "side/bottom-mounted camshaft" makes the engine's structure simple and manufacturing cost low, it is currently widely used. However, its intake and exhaust valves are usually actuated by the same camshaft, which makes it difficult to adjust the intake and exhaust valves separately. As a result, a variable valve technology for high power diesel engines is yet to be developed.

SUMMARY OF THE INVENTION

In light of the aforesaid prior art, the present invention provides a self-adaptive hydraulic variable valve timing system for a diesel engine and a control method. Specifically, it relates to a mechanism which is capable of quickly realizing variable valve timing to be used with the popular diesel engines with side/bottom-mounted camshafts currently widely available on the market and the method of realizing such mechanism.

In order to solve the aforesaid technical problem in the prior art, the present invention provides a technical solution for realizing a self-adaptive hydraulic variable valve timing system for a diesel engine, which comprises at least an engine, wherein an oil pump is provided on a power output shaft of the engine. The oil pump is connected with a pressure regulating reversing valve and also connected with a main lube oil passage of the engine via an oil inlet tube of the oil pump. The pressure regulating reversing valve is connected with an oil line and an oil return tube, respectively. The oil line is connected with an oil supply main tube. The working medium of the system is the engine oil. The oil inlet tube of the oil pump draws oil from the main lube oil passage of the engine, and the oil pump is connected with the power output of the engine. The pressure regulating reversing valve regulates the pressure oil pressurized by the oil pump to a proper operating pressure and switches its flow direction so as to complete a switch of the operating mode of the system. The oil supply main tube, the oil line and the working cylinders of the engine are connected via a self-adaptive pushrod length changing assembly. The oil return tube is connected with an engine sump tank. The self-adaptive pushrod length changing assembly is a slide valve type self-adaptive oil circuit switch mechanism. The slide valve type self-adaptive oil circuit switch mechanism comprises at least a base, a bottom end cap, a piston, a rocker ball pin, a ballcup, an inner spool and a spring. The base is positioned on a cylinder head of the engine working cylinder. The bottom end cap is provided in said base. The rocker ball pin is connected with a valve rocker arm of said engine. The rocker ball pin is pressed against the top end of the piston by the ballcup. A base oil supply hole is provided in said base. The bottom end cap has a bottom end cap oil supply hole, a bottom end cap oil return hole, and a bottom end cap oil return gallery. The inner spool presses against the bottom of the piston by the spring force. The oil supply main tube is a common-rail oil supply tube, and it transmits oil pressure to the working cylinders of the engine through the oil supply branch tubes.

Another version of the technical solution of realizing the self-adaptive hydraulic variable valve timing system for a diesel engine of the present invention is a system which comprises at least an engine, a sump tank, a gear pump and a timing gear. An oil return line is provided between said engine and the sump tank. A pump is provided on a power output shaft of the engine. The oil pump is connected with a pressure regulating reversing valve. A main lube oil passage of the engine is connected with the oil pump via an oil inlet tube of the oil pump. The pressure regulating reversing valve is also connected with an oil line and an oil return tube respectively. The oil line is connected with an oil supply main tube. The working medium of the system is engine oil. The oil inlet tube of the oil pump draws oil from the main lube oil passage of the engine. The oil pump is connected with the power output of the engine. The pressure regulating reversing valve regulates the pressure oil pressurized by the oil pump to a proper operating pressure and switches its flow direction so as to complete a switch of the operating mode of the system. The oil supply main tube, the oil line and the working cylinders of the engine are connected via a self-adaptive pushrod length changing mechanism. The oil return tube is connected with the engine sump tank. The self-adaptive pushrod length changing assembly is a distribution plate controlled oil circuit switch mechanism, which comprises at least an oil inlet tube, a movable plate, a fixed plate, distribution plate oil supply branch tubes and hydraulic pushrod components. The movable plate is connected with the timing gear of said engine, and is provided with a movable plate oil passage hole. The fixed plate is provided with a plurality of oil passage holes corresponding to the positions of the working cylinders of the engine. The hydraulic pushrod components are provided in the working cylinders of the engine. The fixed plate oil passage holes are connected with the hydraulic pushrod components of the working cylinders via the oil supply branch tubes. Each of the hydraulic pushrod component comprises a hydraulic piston, a bottom end cap having an oil inlet and return port, and a bottom pushrod. The distribution plate oil supply branch tubes are connected to the hydraulic pushrod components.

A control method for the self-adaptive hydraulic variable valve timing system for a diesel engine of the present invention. The control method is realized by either of the aforesaid two structures of the self-adaptive hydraulic variable valve timing system for a diesel engine. The action of the pressure regulating reversing valve is controlled by control instructions sent by an engine electronic control unit according to the operating mode of the engine. The control instructions are stored in an MAP operated by the engine. The oil circuit switch is realized by the variable valve timing system in order to achieve the switch between operating mode and non-operating mode of the engine. The control process is as follows:

First, the oil pump draws engine oil from the main lube oil passage of the engine, and meanwhile, the oil pump obtains motive power from the power output of said engine.

The pressure regulating reversing valve pressurizes the engine oil to 10 Mpa, and determines whether to switch direction according to the specific values of the engine's rotational speed, load and the temperature of the engine oil, and realizes the switch between operating mode and non-operating mode of the engine by controlling the action of said pressure regulating reversing valve. When the temperature of the engine oil is higher than 70° C., and the engine's rotational speed is greater than or equal to 1300 r/m, and the load is greater than or equal to 50%, the pressure regulating reversing valve switches the engine to the operating mode. Otherwise, the pressure regulating reversing valve remains motionless, the engine remains in the non-operating mode, and the pressure oil returns directly to the engine sump tank through the oil return tube.

When the engine is switched to the operating mode, the pressure oil enters the self-adaptive pushrod length changing mechanism through the oil line and actuates self-adaptive oil circuit switch. After the pressure oil does its work, it returns to the engine sump tank through the oil return tube.

Compared to the prior art, the advantageous effects of the present invention are:

(1) The variable valve timing system of the present invention can be practiced by retrofitting the existing fixed valve engine, with only a small modification to the original engine, and thus the industrialization thereof can be easily realized.

(2) The motive power source and working medium of the variable valve timing system of the present invention come from the engine itself. It does not depend on external equipment to operate but also forms a system itself.

(3) The variable valve timing system of the present invention may work in an operating mode or a non-operating mode according to the requirement, and it can not only meet the actual need of the engine but also serve the functions of energy conservation and environmental protection.

(4) There are only a few component parts that are required for the variable valve timing system of the present invention, and the system is simple in structure and low in cost.

Figure 1:
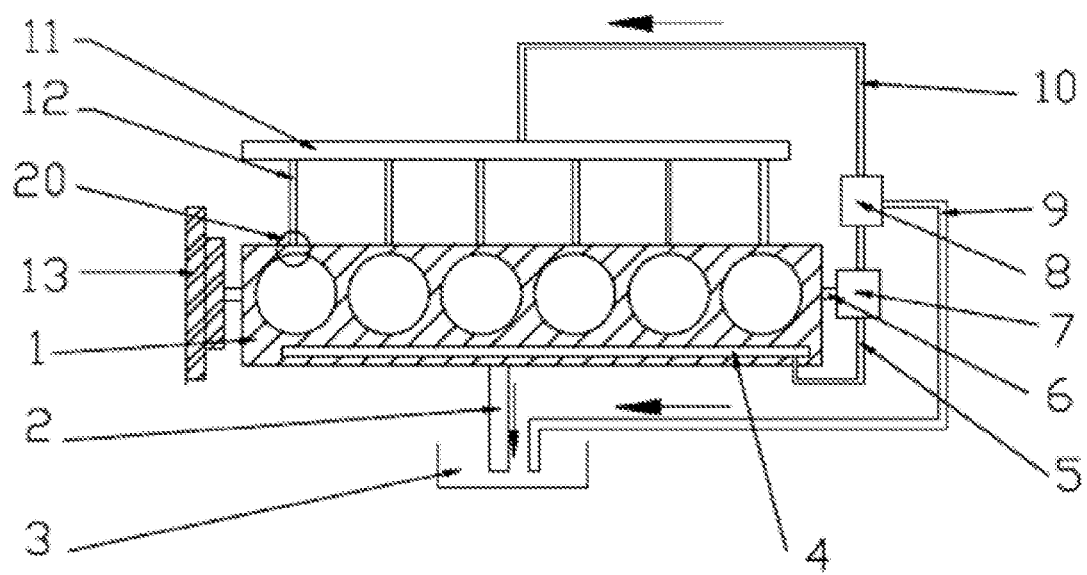
FIG. 1 depicts a schematic view of a slide valve controlled oil circuit switch adopted to realize the self-adaptive variable valve timing system.

Wherein:
1—engine block
2—engine oil return line
3—engine sump tank
4—engine main lube oil passage
5—oil pump oil inlet tube
6—engine power output shaft
7—oil pump
8—pressure regulating reversing valve
9—oil return tube
10—oil line
11—oil supply main tube
12—oil supply branch tubes
13—engine flywheel
20—slide valve type realtime oil circuit switch mechanism
201—valve rocker arm
26, 202—pressure chamber
203—inner spool
204—bottom end cap oil return hole
205—base oil return hole
206—base
207—spring
208—engine cylinder head
27, 209—bottom end cap
29, 210—bottom pushrod
211—tappet
212—camshaft
213—rocker ball pin
214—ballcup
215—piston
216—bottom end cap oil inlet hole
217—base oil inlet hole
218—base oil return gallery
219—bottom end cap oil return gallery
16—timing gear
17—camshaft
18—distribution plate controlled oil circuit switch mechanism
181'—distribution plate oil supply branch tubes
23—hydraulic pushrod components
181—oil supply branch tubes
182—fixed plate oil passage holes
183—fixed plate
184—distribution plate oil inlet tube
185—movable plate
186—movable plate oil passage hole
187—distribution plate oil return tube
25—hydraulic piston
28—oil inlet and return port

DETAILED DESCRIPTION OF PARTICULAR EMBODIMENTS OF THE INVENTION

The present invention is further described in the following with reference to the drawings and the detailed embodiments.

The object of the self-adaptive hydraulic variable valve timing system for a diesel engine of the present invention is to realize variable valve timing on a side/bottom-mounted camshaft diesel engine, and it is realized mainly by adding an assembly of self-adaptive pushrod length changing mechanism to the original engine pushrod, which is able to change the pushrod length, by means of a bottom pushrod in said mechanism, according to the actual need of the engine so that the original pushrod and the bottom pushrod form an assembled intake valve pushrod.

The movement of the hydraulic plunger in the self-adaptive pushrod length changing mechanism is realized by the pressure oil flowing in and out of the pressure chamber of the self-adaptive pushrod length changing mechanism to push the hydraulic plunger (piston) to make the up-and-down movement. The process of the hydraulic oil's flowing in and out is automatically accomplished by the hydraulic circuit of the self-adaptive pushrod length changing mechanism. The use of the hydraulic circuit formed by the self-adaptive pushrod length changing mechanism ensures that the hydraulic oil maintains fixed phase for flowing in and out at a different rotational speed of the engine such that the valve timing maintains substantially fixed or follows a predetermined variation pattern, and thus an inventive point of the present invention lies in the self-adaptive valve control. The motive power of the hydraulic power supply of the present invention is the engine power output which comes from coupling to the engine output device. The hydraulic oil can be the engine oil or a separate hydraulic oil. The former method needs a simple structure, and the latter method is applicable to engines which have strict transient response requirements, for which the temperature or the amount of engine oil cannot meet the response requirements.

As shown in FIG. 1, the self-adaptive hydraulic variable valve timing system for a diesel engine of the present invention at least comprises an engine 1, wherein an oil pump 7 is provided on a power output shaft 6 of the engine, and said oil pump 7 may be one of a gear pump, a plunger pump, a rotor pump and a vane pump. The oil pump 7 is connected with a pressure regulating reversing valve 8. A main lube oil passage 4 of the engine is connected with the oil pump 7 via an oil inlet tube 5 of the oil pump. The pressure regulating reversing valve 8 is also connected with an oil line 10 and an oil return tube 9 respectively. Oil line 10 is connected with an oil supply main tube 11. The working medium of the system is engine oil. The oil inlet tube 5 of the oil pump draws oil from the main lube oil passage 4 of the engine. The oil pump 7 is connected with the power output of the engine 1. The pressure regulating reversing valve 8 regulates the pressure oil pressurized by the oil pump 7 to a proper operating pressure and switches its flow direction so as to complete a switch of the operating state of the system. Oil supply main tube 11, oil line 10 and the working cylinders of the engine are connected via a self-adaptive pushrod length changing mechanism. Oil return tube 9 is connected with engine sump tank 3.

As shown in FIG. 1, the oil supply manner of the present invention can be common-rail oil supply, i.e. an oil supply main tube is connected with oil supply branch tubes to supply oil to the hydraulic pushrod components of the working cylinders of the engine. According to the design requirements, the hydraulic pushrod component needs oil supply and oil return once in each cycle to accomplish the adjustment of valve lift and timing. Since the rotational speed of the engine is high, the process of switching between oil supply and oil return needs to be exceptionally speedy and precise. Meanwhile, the valve spring pressure should be sufficiently strong to prevent the hydraulic piston from being pushed up. Therefore, the self-adaptive switch control over a pressure oil circuit having a high operating pressure and a large flow is the focal point and challenge of the present invention.

According to the present invention, two self-adaptive pressure oil switching embodiments are exemplified for realization of the length change of the self-adaptive pushrod. They are respectively a slide valve type self-adaptive oil circuit switch mechanism and a distribution plate type self-adaptive oil circuit switch mechanism.

Figure 2:
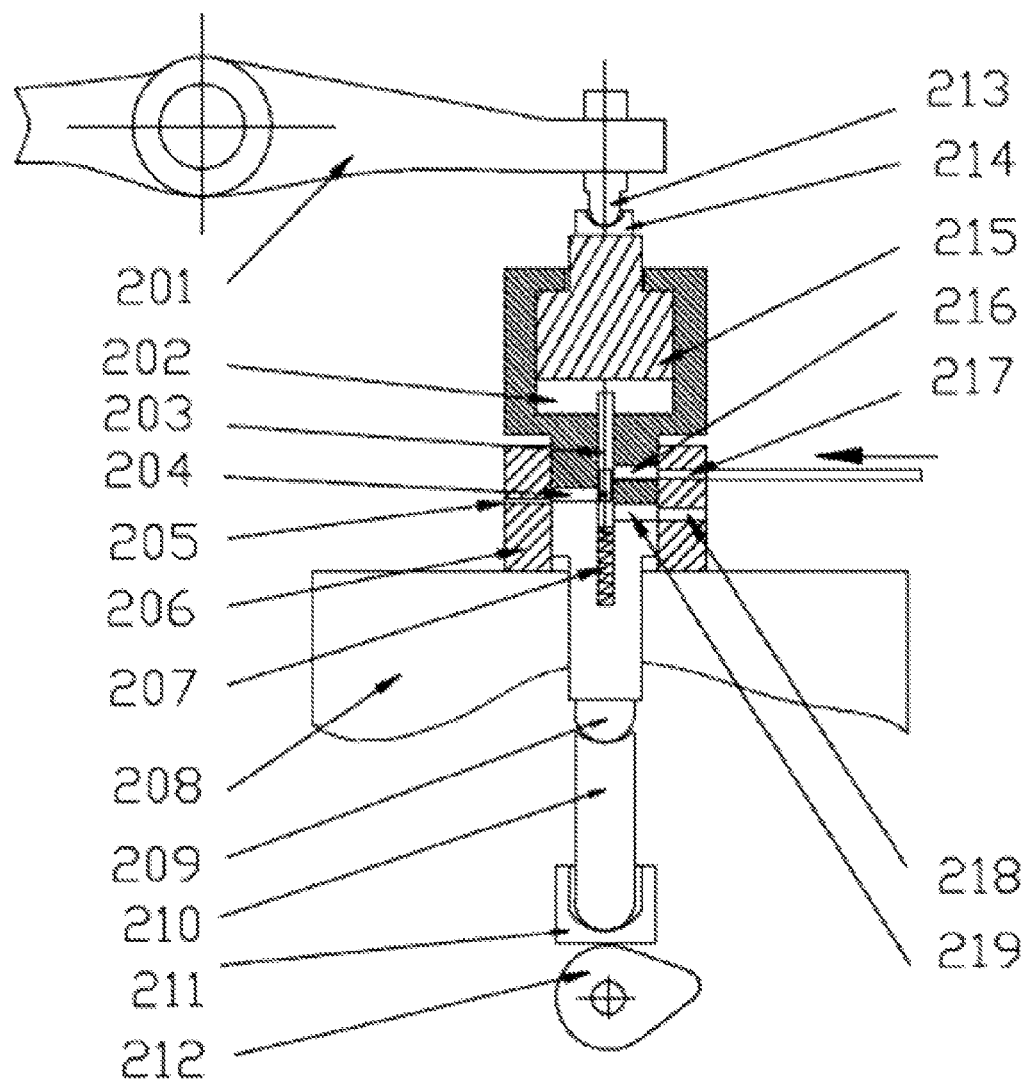
FIG. 2 depicts a schematic view of the inner structure of the slide valve type self-adaptive oil circuit switch mechanism 20 shown in FIG. 1.

As shown in FIGS. 1 and 2, the slide valve type self-adaptive oil circuit switch mechanism uses a camshaft to drive a slide valve to control the realtime switch of the oil circuit to realize the change of pushrod length so as to further realize self-adaptive control over the timing phase of valve closing.

As shown in FIG. 2, the slide valve type self-adaptive oil circuit switch mechanism 20 comprises at least a base 206, a bottom end cap 209, a piston 215, a rocker ball pin 213, a ballcup 214, an inner spool 203 and a spring 207. The base 206 serving the dual function of a slide valve and guiding is mounted on the cylinder head 208 of the engine. The bottom end cap 209 is provided in the base 206. The rocker ball pin 213 is connected with the valve rocker arm 201 of the engine 1. The rocker ball pin 213 is pressed against the top end of the piston 215 by means of the ballcup 214, and the structure of the rocker ball pin 213 and the ballcup 214 not only ensures the effective transmission of the movement but also ensures the freedom of the movement of the valve rocker arm 201. A base oil inlet hole 217 is provided in said base 206. A bottom end cap oil inlet hole 216, a bottom end cap oil return hole 204 and a bottom end oil return gallery 219 are provided in bottom end cap 209. Inner spool 203 is pressed against the bottom of the piston 215 under the pressure of the spring 207. The oil supply main tube is a common-rail oil supply tube, and it transmits the oil pressure to the slide valve type self-adaptive oil circuit switch mechanism of the cylinders of the engine through the oil supply branch tubes.

When the system is in the non-operating mode, the engine oil supplied by said oil pump 7 flows directly into the sump tank 3 through the pressure regulating reversing valve 8, the length of said hydraulic pushrod component does not change, and the hydraulic pushrod component makes up-and-down reciprocating movement along with the rotation of the engine camshaft such that the intake valve moves according to the timing and lift of the original engine. The process of the valve movement is reflected in the original engine state controlled purely by the camshaft.

When the system is in the operating mode, the engine oil supplied by oil pump 7 is regulated by the pressure regulating reversing valve to a proper oil pressure and supplies oil to the oil line 10, and thus pressure is produced in the tube. Bottom end cap 209 is driven by the camshaft 212 of the engine to make up-and-down reciprocating movements along with tappet 211 and pushrod 210, at a certain moment of which movement, bottom end cap oil inlet hole 216 is brought into communication with base oil inlet hole 217, and then oil begins to flow into pressure chamber 202, and after a certain period of oil inflow, piston 215 moves upward, and inner spool 203 moves upward along with piston 215 under the pressure of spring 207. Tappet 211 begins to drop after reaching the highest point and, at a certain position of the drop, brings bottom end cap oil return hole 204 into communication with base oil return hole 205, causing the hydraulic cylinder to slowly discharge the oil. When camshaft 212 rotates to a base circle, the valve lift enters its maintaining stage, and the valve closing timing begins to delay, during which the valve descending speed is determined entirely by the diameter of bottom end cap oil return hole 204. At this time, bottom end cap oil return gallery 219 and base oil return gallery 218 have been brought into communication with each other. As piston 215 continues to move downward, inner spool 203 is forced to move downward, and when the oil distribution edge of the inner spool reaches bottom end cap oil return gallery 219, pressure chamber 202 is brought into communication with bottom end cap oil return gallery 219 by inner spool 203, while bottom end cap oil return gallery 219 and base oil return gallery 218 have been brought into communication with each other at the moment, and thus the engine oil in pressure chamber 202 is discharged out quickly, and piston 215 restores to its position and the valve is closed. Hence, the valve timing regulation in a valve actuation cycle of the engine is completed. Detailed structure and operation process of the slide valve type self-adaptive oil circuit switch mechanism, which is not part of the present invention, was disclosed previously in Chinese patent number of 200810152274.7, titled Slide valve Type Two-mode Engine Intake Valve Delaying Closing Mechanism.

The core of the variable valve system controlled by the slide valve type oil circuit switch is that it has a self-adaptive slide valve mechanism, which accomplishes the realtime switch of the oil circuit by means of the movement of the pushrod driven by the camshaft and a set of specially designed slide valve mechanism, and it controls the pressure oil to flow into and out of the hydraulic pushrod components timely so as to realize valve timing regulation. The whole system has a compact structure and a dexterous design, and the size and position of the oil inlet and return holes determines the variable quantity of the valve timing. The self-adaptive slide valve oil circuit switch structure and the hydraulic pushrod components are made in an integral whole, which eliminates the difference caused by the hydraulic operating lag, and no matter at what speed the engine rotates, the oil circuit realtime switch is performed according to a fixed valve timing phase, thus ensuring consistency in the performance characteristics of the variable valve system under different working conditions.

Figure 3:
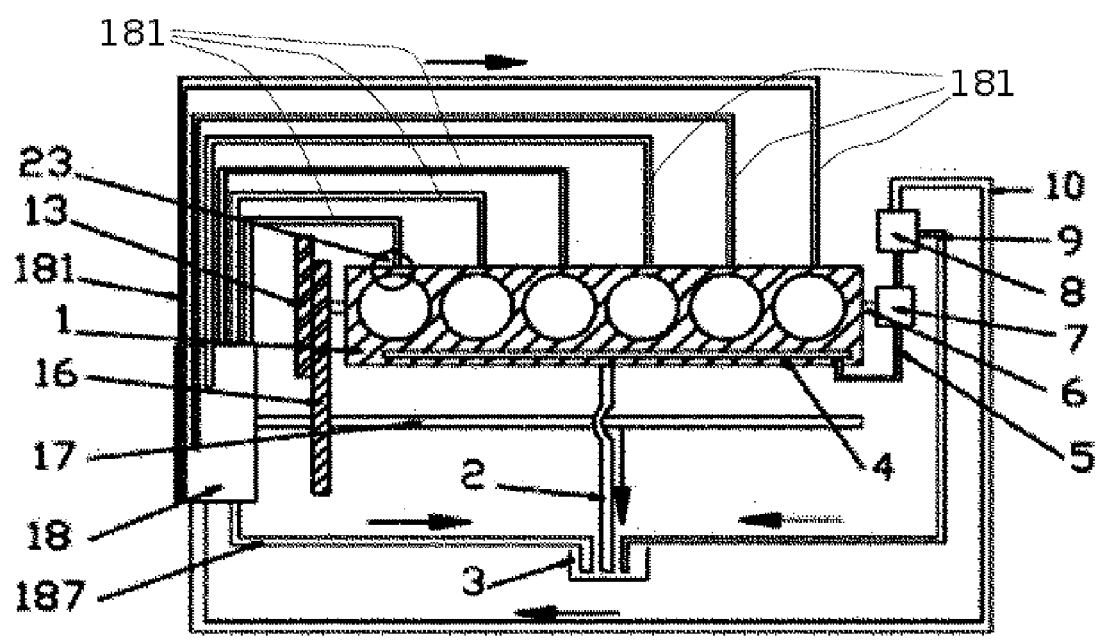
FIG. 3 depicts a schematic view of a distribution plate controlled oil circuit switch adopted to realize self-adaptive variable valve timing system.
Figure 4:
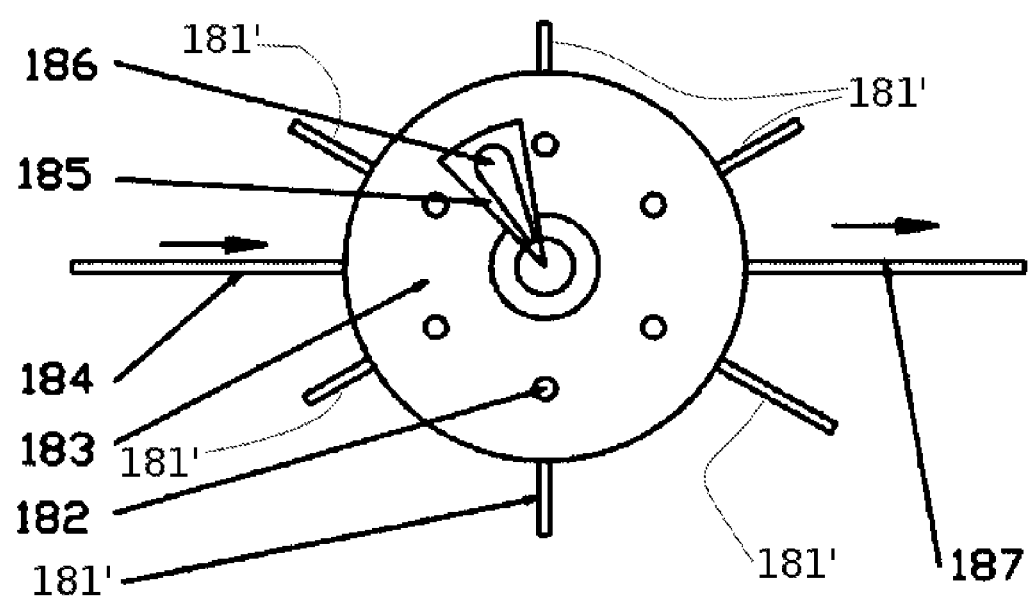
FIG. 4 depicts a schematic view of the structure of the distribution plate controlled oil circuit switch mechanism 18 shown in FIG. 3.
Figure 5:
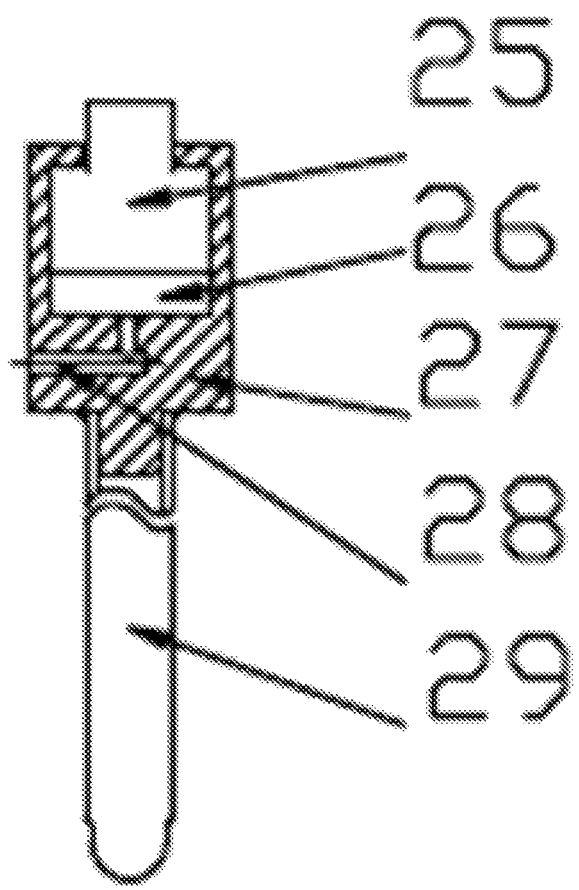
FIG. 5 depicts a schematic view of the structure of the hydraulic pushrod component 23 shown in FIG. 3.

As shown in FIGS. 3, 4 and 5, the self-adaptive hydraulic variable valve timing system for a diesel engine, which uses the distribution plate type self-adaptive oil circuit switch mechanism, comprises at least an engine 1, an engine oil return line 2, a sump tank 3, a gear pump 7, a timing gear 16 and a distribution plate controlled oil circuit switch mechanism 18. An oil pump 7 is provided on a power output shaft 6 of the engine. The oil pump 7 is connected with a pressure regulating reversing valve 8. A main lube oil passage 4 of the engine is connected with the oil pump 7 via an oil inlet tube 5 of the oil pump. The pressure regulating reversing valve 8 is also connected with an oil line 10 and an oil return tube 9 respectively. The oil line 10 is connected with the distribution plate controlled oil circuit switch mechanism 18. The working medium of the system is engine oil. The oil inlet tube 5 of the oil pump draws oil from the main lube oil passage 4 of the engine. The oil pump 7 is connected with the power output of the engine 1. The pressure regulating reversing valve 8 regulates the pressure oil pressurized by the oil pump 7 to a proper operating pressure and switches its flow direction so as to complete a switch of the operating state of the system. The distribution plate controlled oil circuit switch mechanism 18 distributes the pressure oil from the oil line 10 to the hydraulic pushrod components of the cylinders through the distribution plate oil supply branch tubes 181. The oil return tube 9 and oil return tube 187 are connected with the engine sump tank 3.

As shown in FIG. 4, the self-adaptive pushrod length changing mechanism is a distribution plate controlled oil circuit switch mechanism 18, which comprises at least an oil inlet tube 184, an oil return tube 187, a movable plate 185, a fixed plate 183, distribution plate oil supply branch tubes 181' and hydraulic pushrod components. The movable plate 185 is connected with the timing gear 16 of said engine 1. A movable plate oil passage hole 186 is provided in said movable plate 185. Fixed plate oil passage holes 182 corresponding to the cylinders of the engine in order are provided in the fixed plate 183. The oil line 10 is connected with the fixed plate 183 in said distribution plate controlled oil circuit switch mechanism 18. The hydraulic pushrod components are provided in the working cylinders of the engine. The fixed plate oil passage holes 182 are connected with the hydraulic pushrod components of the working cylinders via the oil supply branch tubes, and as shown in FIG. 5, each of said hydraulic pushrod components comprises a hydraulic piston 25, a bottom end cap 27 having an oil inlet and return port 28, and a bottom pushrod 29. The fixed plate 183 of the distribution plate controlled oil circuit switch mechanism 18 is fixed on the engine block, and the movable plate 185 is connected with the timing gear 16 to realize valve timing. The valve rocker arm is pressed against the hydraulic piston 25.

The self-adaptive hydraulic variable valve timing system for a diesel engine adopting the distribution plate type self-adaptive oil circuit switch mechanism works in cooperation with the timing gear 16 and the camshaft 17, wherein the timing gear 16 connected with the camshaft 17 drives the camshaft 17 and the movable plate 185 of the distribution plate controlled oil circuit switch mechanism 18 to rotate synchronously, and the movable plate oil passage hole 186 is brought into communication with the fixed plate oil passage holes 182 to communicate with the oil inlet and return lines respectively such that the pressure oil flows in and out of the pressure chamber 26 of the hydraulic pushrod components 23 timely and drives the piston 25 to move and produce an additional lift to overlap the original valve lift so as to realize the variation of valve timing. The duration of the oil inflow and oil discharge in the hydraulic pushrod components 23 in a working cycle of the variable valve timing system is determined by the size of the movable plate oil passage hole 186 and the fixed plate oil passage holes 182 in the distribution plate controlled oil circuit switch mechanism 18, and the timing of the beginning of oil inflow and oil return processes is determined by the relative positions of the two holes. A distribution plate can distribute high pressure oil for a plurality of hydraulic pushrod components 23 at the same time by making different numbers of oil outlet holes in the fixed plate according to the need.

When the system is in the non-operating mode, the engine oil supplied by said oil pump 7 flows directly into the sump tank 3 through said pressure regulating reversing valve 8, and the length of said hydraulic pushrod component does not change, and the hydraulic pushrod component makes up-and-down reciprocating movement along with the rotation of the engine camshaft such that the intake valve moves according to the timing and lift of the original engine. The process of the valve movement is reflected in the original engine state controlled purely by the camshaft.

When the system is in the operating mode, the engine oil supplied by said oil pump 7 is regulated by the pressure regulating reversing valve to a proper oil pressure and supplies oil to the oil line 10, and thus pressure is produced in the tube. The pressure oil enters the distribution plate through the oil inlet tube 184 of the distribution plate controlled oil circuit switch mechanism 18 for distribution. The movable plate 185 rotates synchronously with the camshaft 17, and when the original intake valve lifts to a certain proper time, the movable plate oil passage hole 186 is brought into communication with the fixed plate oil passage hole 182 of a certain cylinder, and the pressure oil flows into the pressure chamber 26 of the hydraulic pushrod component through a distribution plate oil supply branch tube 181 and drives the piston 25 to move, and the increase of the length of the hydraulic pushrod component creates an additional lift to overlap the original valve lift. As the camshaft 17 continues to rotate for a certain angle, the distribution plate oil inlet hole 186 rotates past to cut the oil inlet line and communicate with the oil return line, the pressure oil in the pressure chamber 26 flows back through the oil inlet and return port 28 under the effect of the valve spring pressure, and the hydraulic pushrod component 23 restores its original length and the additional lift disappears. Hence, the valve timing regulation in a valve actuation cycle of the engine is completed.

The variable valve system controlled by the distribution plate type self-adaptive oil circuit switch depends on a distribution plate to control the on and off of the oil circuit so as to realize valve timing control. The requirements of variable timing of the air intake and exhaust of the engine can be met by accurately adjust the position and size of the oil holes in the distribution plate so as to regulate the engine to an optimal valve actuating state. The movable plate 185 of the distribution plate rotates synchronously with the camshaft of the engine, and thus no matter at what speed the engine rotates, the oil circuit realtime switch is performed according to a fixed timing phase, which has a sound self-adaptiveness. The difference in the rotation angle caused by the delay of the timing for producing oil pressure in the tube at different rotational speeds can be compensated by regulation of the operating oil pressure to ultimately achieve substantial consistency of the performance characteristics of the variable valve system under different working conditions.

The different pressure oil self-adaptive switching methods have the following common point: by retrofitting the original pushrod into an assembled hydraulic pushrod component, the assembled hydraulic pushrod component creates an additional lift to overlap the original valve lift under hydraulic pressure so as to change the original valve timing or lift and achieve variable valve timing; and both adopt a self-adaptive realtime oil circuit switch mechanism to achieve the control over the stretching and retraction of the assembled hydraulic pushrod component.

The working medium of the present invention is the engine oil of the engines itself, which is preferably used for engines which do not have strict transient response requirements. As for engines which have special requirements, such as strict transient response requirements and with insufficient time to preheat the engine oil to a desired temperature, the working medium may be a separate hydraulic oil system which is accompanied by special oil inlet and return tubes.

The source of the pressure oil in the working process of the present invention is the hydraulic oil provided by coupling a hydraulic pump (or other pumps which can meet flux and pressure needs) with a certain power output position of the engine. The present invention also switches between the operating states, i.e. operating mode and non-operating mode of the self-adaptive valve control mechanism by a hydraulic reversing valve according to the operating requirements of the engine. Furthermore, the movement pattern of the intake valve may be changed by changing the oil pressure. The source of the pressure oil, the control over the hydraulic reversing valve and how to change the movement pattern of the intake valve by changing the oil pressure, etc. as mentioned above belong to ordinary skill in the art, and thus the processes for realizing them is omitted here.

Figure 6:
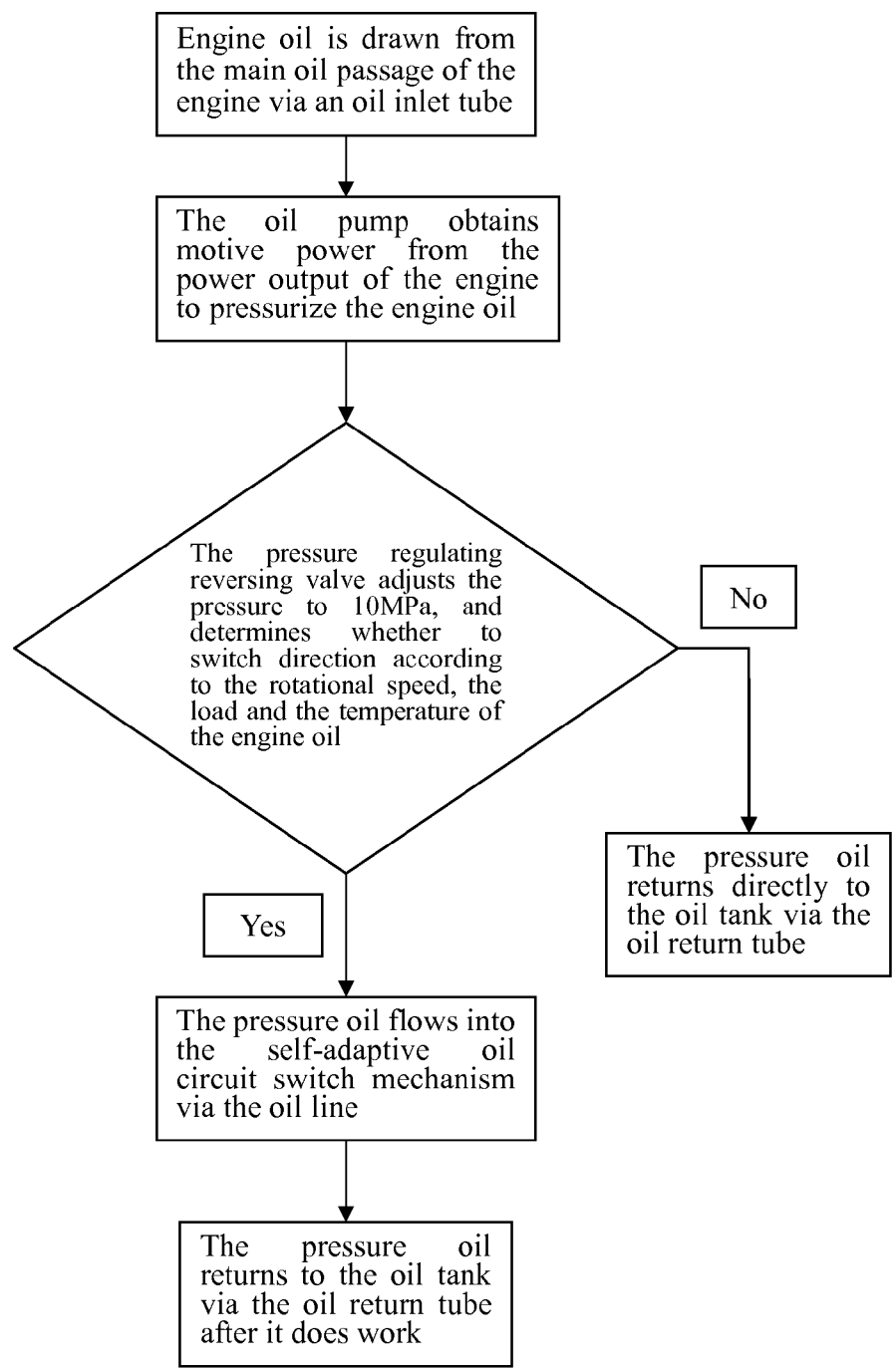
FIG. 6 a main block flowchart of the control method of the present invention.

The control over the self-adaptive hydraulic variable valve timing system for a diesel engine is mainly embodied in the determination of the operating state of the engine and the switch between the operating mode and the non-operating mode of the variable valve timing system. The pressure regulating reversing valve in the present invention realizes the oil circuit switch according to control instructions sent by an engine electronic control unit to realize the switch between the engine's operating mode and non-operating mode; said control instructions are stored in the MAP operated by the engine, and the optimal control strategy is obtained by comprehensively considering the operation parameters such as the temperature of the engine oil, the rotational speed and load of the engine so as to realize highly effective combustion of the engine with low emissions. As parameter conditions for determining the action of the pressure regulating reversing valve in the present invention, the engine oil pressure of the engine is adjusted to 10 Mpa, and the temperature of the engine oil is controlled to be greater than 70° C., preferably in a range of 70° C. to 95° C., and the rotational speed of the engine is greater than or equal to 1300 r/m, and the load is greater than or equal to 50%, and then the pressure regulating reversing valve acts so that the variable valve timing mechanism of the engine is in the operating mode. As shown in FIG. 6, the control process is as follows:

The switch between the operating mode and the non-operating mode of the engine is realized by achieving oil circuit switch by the variable valve timing system; and the control process is as follows:

The oil pump 7 draws engine oil from the main lube oil passage 4 of the engine, and meanwhile, said pump 7 obtains motive power from the power output of the engine. The pressure regulating reversing valve 8 pressurizes the engine oil to 10 Mpa, and determines whether to switch direction or not based on the specific values of the engine's rotational speed, load and the temperature of the engine oil, it acts to actuate the switch between the operating mode and the non-operating mode of the engine. When the temperature of the engine oil is higher than 70° C., the engine's rotational speed is greater than or equal to 1300 r/m, and the load is greater than or equal to 50%, the pressure regulating reversing valve acts to switch the engine to the operating mode. Otherwise, the pressure regulating reversing valve remains motionless, the engine remains in the non-operating mode, and the pressure oil returns directly to engine sump tank 3 through oil return tube 9. When the engine is switched to the operating mode, the pressure oil enters the self-adaptive pushrod length changing mechanism through oil line 10 to actuate self-adaptive oil circuit switch and, after the pressure oil does its work, it returns to engine sump tank 3 through oil return tube 9.

Injecting timing, air supercharging, variable valve timing and EGR are all for arranging the combustion process to realize highly effective combustion with low emissions. The self-adaptive hydraulic variable valve timing system for a diesel engine of the present invention is one of the key technologies for realizing highly effective combustion with low emissions. Variable valve timing is able to provide optimized valve opening and closing timing or lift at different rotational speed and load within the whole range of the engine capacity so as to improve the engine's air intake and exhaust performance, and better meet the requirements of engine's dynamic property, economy and exhaust emission at both high and low speeds and under both heavy and light loads, thereby improving the engine's overall performance. The switch between the original engine valve timing or lift and the varied valve timing or lift as an optimal combustion solution can be determined by the conditions under which the engine is operating, such as engine's rotational speed, injection timing, load, EGR rate, air intake supercharging and temperature of the engine oil so as to decide whether the self-adaptive hydraulic variable valve timing system for a diesel engine should be in the non-operating mode or the operating mode. The highly effective combustion process with low emissions can be ultimately realized in cooperation with other control means for controlling the in-cylinder combustion of the engine.

Compared with the prior art, the advantages of the self-adaptive hydraulic variable valve timing system for a diesel engine of the present invention lie in:

(1) The prominent feature of the variable valve timing system of the present engine is self-adaptive, which can meet the need of variable valve timing under different working conditions.

(2) The variable valve timing system of the present engine is simple in structure and forms an independent system, it does not need any additional equipment in operation, and only a few essential components are needed to accomplish a fast assembling. Variable valve timing can be easily realized by simple modification to an existing fixed valve engine, it needs only a few additional component, and the production cost thereof is low.

(3) The detailed embodiments of the variable valve timing system according to the present invention may be varied with the same basic principle, and selection of them can be made according to the particular conditions in a specific circumstance, which enhances the flexibility and practicability of the application thereof.

(4) The variable valve timing system of the present invention works under two modes, and it can not only meet the need of different working conditions of the engine, but also effectively reduce energy consumption.

Although the present invention is described above with reference to the figures, it is not limited to the aforesaid detailed embodiments, which are merely illustrative but not restrictive, and those of ordinary skill in the art may make variations under the inspiration of the present invention without departing from the gist of the present invention, and such variations should be within the protection scope of the present invention.

What is claimed is:

1. A self-adaptive hydraulic variable valve timing system for a diesel engine, comprising an oil pump, a pressure regulating reversing valve, an oil return tube, an oil line, an oil supply main tube, an oil supply branch tube, and a self-adaptive pushrod length changing assembly which comprises a pushrod having a length that changes automatically according to the speed of said diesel engine, wherein said oil pump is connected to said pressure regulating reversing valve and has an oil inlet tube connected to a main lube oil passage of said diesel engine, said pressure regulating reversing valve either is connected, in an operating mode, to said oil line or, in a non-operating mode, to said oil return tube which is connected to a sump tank of said diesel engine, and said oil line is connected to said oil supply main tube which in turn is connected to said oil supply branch tube which is then connected to said self-adaptive pushrod length changing assembly.

2. The self-adaptive hydraulic variable valve timing system of claim 1, wherein said oil pump is connected to a power output shaft of said diesel engine and obtains motive power thereof.

3. The self-adaptive hydraulic variable valve timing system of claim 1, wherein said self-adaptive pushrod length changing assembly is a slide valve type self-adaptive oil circuit switch mechanism.

4. The self-adaptive hydraulic variable valve timing system of claim 1, wherein said self-adaptive pushrod length changing assembly is a distribution plate controlled oil circuit switch mechanism.

5. The self-adaptive hydraulic variable valve timing system of claim 3, wherein said slide valve type self-adaptive oil circuit switch mechanism comprises one oil inlet and two oil outlets, said oil inlet being dynamically formed when a bottom end cap oil inlet hole (216) is brought in line with a base oil inlet hole (217), said one oil outlet being dynamically formed when a bottom end cap oil return hole (204) is brought in line with a base oil return hole (205), and said another oil outlet being dynamically formed when a bottom end cap oil return gallery (219) is brought in line with a base oil return gallery (218).

6. The self-adaptive hydraulic variable valve timing system of claim 4, wherein said distribution plate controlled oil circuit switch mechanism comprises an oil inlet tube, a movable plate with an oil passage hole, a fixed plate connected to said oil line and having a plurality of oil passage holes each corresponding to a working cylinder of said diesel engine, a plurality of distribution plate oil supply branch tubes and a hydraulic pushrod component in each said working cylinder; said movable plate is connected with a timing gear of said diesel engine; said oil passage holes on said fixed plate are each connected to said hydraulic pushrod component via one of said oil supply branch tubes; and said hydraulic pushrod component comprises a hydraulic piston, a bottom end cap which has an oil inlet and return port, and a bottom pushrod.

7. The self-adaptive hydraulic variable valve timing system of claim 1, wherein said oil pump is a gear pump, a plunger pump, a rotor pump or a vane pump.

\* \* \* \* \*